(12) United States Patent
Kraemer et al.

(10) Patent No.: US 7,882,560 B2
(45) Date of Patent: Feb. 1, 2011

(54) METHODS AND APPARATUS PROVIDING COMPUTER AND NETWORK SECURITY UTILIZING PROBABILISTIC POLICY REPOSTURING

(75) Inventors: Jeffrey A. Kraemer, Wellesley, MA (US); Andrew Zawadowskiy, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 11/415,022

(22) Filed: May 1, 2006

(65) Prior Publication Data

US 2007/0143850 A1    Jun. 21, 2007

Related U.S. Application Data

(60) Provisional application No. 60/751,439, filed on Dec. 16, 2005.

(51) Int. Cl.
*G06F 21/00* (2006.01)
*G06F 21/22* (2006.01)
*G06F 21/06* (2006.01)
*G06F 12/16* (2006.01)

(52) U.S. Cl. .............. 726/22; 726/23; 726/24; 726/25; 726/26; 713/189; 713/190; 713/191; 705/51

(58) Field of Classification Search .......... 709/223, 709/224
See application file for complete search history.

(56) References Cited

U.S. PATENT DOCUMENTS

| | | | | |
|---|---|---|---|---|
| 7,237,267 B2 * | 6/2007 | Rayes et al. | ........ | 726/25 |
| 7,263,718 B2 * | 8/2007 | O'Brien et al. | ........ | 726/6 |
| 7,293,087 B2 * | 11/2007 | Styles et al. | ........ | 709/224 |
| 7,380,267 B2 * | 5/2008 | Arai et al. | ........ | 726/1 |
| 7,401,360 B2 * | 7/2008 | Ravishankar et al. | ........ | 726/22 |
| 7,448,084 B1 * | 11/2008 | Apap et al. | ........ | 726/24 |
| 7,516,476 B1 * | 4/2009 | Kraemer et al. | ........ | 726/1 |
| 7,546,629 B2 * | 6/2009 | Albert et al. | ........ | 726/1 |
| 7,555,776 B1 * | 6/2009 | Lymer et al. | ........ | 726/22 |
| 7,565,426 B2 * | 7/2009 | Jones et al. | ........ | 709/224 |
| 7,715,315 B1 * | 5/2010 | Ferguson et al. | ........ | 370/230 |
| 2002/0166063 A1 * | 11/2002 | Lachman et al. | ........ | 713/200 |
| 2004/0205474 A1 * | 10/2004 | Eskin et al. | ........ | 715/500 |

(Continued)

OTHER PUBLICATIONS

PCT International Search Report and Written Opinion of the International Searching Authority having date of mailing of Jul. 8, 2008 in co-pending PCT International Patent Application No. PCT/US07/10409 (International Filing Date of Apr. 30, 2007), entitled: Methods and Apparatus Providing Computer and Network Security Utilizing Probablistic Policy Reposturing.

*Primary Examiner*—Syed A. Zia
(74) *Attorney, Agent, or Firm*—Hickman Palermo Truong & Becker LLP

(57) ABSTRACT

A system defines at least one key event to be monitored by at least one agent, and creates a graphical model for the at least one key event. The system observes the at least one key event. The system infers a degree of attack on the computer system based on an observation of the at least one key event in conjunction with a result of an effect the at least one key event has on the graphical model. The system then adjusts a security policy based on an output of the graphical model.

29 Claims, 7 Drawing Sheets

U.S. PATENT DOCUMENTS

| | | | |
|---|---|---|---|
| 2006/0064582 A1* | 3/2006 | Teal et al. | 713/156 |
| 2006/0070128 A1* | 3/2006 | Heimerdinger et al. | 726/23 |
| 2006/0184682 A1* | 8/2006 | Suchowski et al. | 709/229 |
| 2006/0272024 A1* | 11/2006 | Huang et al. | 726/26 |
| 2007/0136603 A1* | 6/2007 | Kuecuekyan | 713/185 |
| 2009/0235324 A1* | 9/2009 | Griffin et al. | 726/1 |
| 2010/0082513 A1* | 4/2010 | Liu | 706/46 |

* cited by examiner

211 CREATE A GRAPHICAL MODEL FOR THE AT LEAST ONE KEY EVENT

212 CREATE A BAYESIAN NETWORK FOR USE IN DETECTING THE DEGREE OF ATTACK ON THE COMPUTER SYSTEM

OR

213 CREATE AT LEAST ONE SUBJECTIVE INITIAL PROBABILITY FOR EACH NODE IN THE PLURALITY OF NODES WITHIN THE GRAPHICAL MODEL

214 ADJUST THE AT LEAST ONE SUBJECTIVE INITIAL PROBABILITY OF AT LEAST ONE NODE WITHIN THE PLURALITY OF NODES, USING AT LEAST ONE STATISTICAL DATUM ASSOCIATED WITH A PREVIOUS SECURITY ATTACK

FIG. 5

215 OBSERVE THE AT LEAST ONE KEY EVENT

216 DETECT THE AT LEAST ONE KEY EVENT IS ASSOCIATED WITH A SET OF KEY EVENTS

217 IDENTIFY THE AT LEAST ONE KEY EVENT IS RELATED TO THE SET OF KEY EVENTS

OR

218 IDENTIFY THE AT LEAST ONE KEY EVENT IS NOT RELATED TO THE SET OF KEY EVENTS

OR

219 OBSERVE AN ORDER OF THE SET OF KEY EVENTS, THE ORDER INCLUDING A PLACEMENT OF THE AT LEAST ONE KEY EVENT WITHIN THE ORDER OF THE SET OF KEY EVENTS

*FIG. 6*

220 INFER A DEGREE OF ATTACK ON THE COMPUTER SYSTEM BASED ON AN OBSERVATION OF THE AT LEAST ONE KEY EVENT IN CONJUNCTION WITH A RESULT OF AN EFFECT THE AT LEAST ONE KEY EVENT HAS ON THE GRAPHICAL MODEL

221 UTILIZE THE BAYESIAN NETWORK TO INFER THE DEGREE OF ATTACK ON THE COMPUTER SYSTEM

OR

222 CORRELATE THE DEGREE OF ATTACK TO A CONFIGURABLE LIMIT

223 INITIALIZE THE CONFIGURABLE LIMIT OF THE DEGREE OF ATTACK

OR

224 DEFINE THE CONFIGURABLE LIMIT OF THE DEGREE OF ATTACK AS A RANGE OF CONFIGURABLE LIMITS

OR

225 MODIFY THE DEGREE OF ATTACK ON THE COMPUTER SYSTEM BASED ON THE OBSERVATION OF THE AT LEAST ONE KEY EVENT

*FIG. 7*

METHODS AND APPARATUS PROVIDING COMPUTER AND NETWORK SECURITY UTILIZING PROBABILISTIC POLICY REPOSTURING

CROSS REFERENCE TO RELATED APPLICATIONS

The present application claims the benefit of U.S. Provisional Patent Application No. 60/751,439, filed on Dec. 16, 2005, which is incorporated herein by reference.

BACKGROUND

Computer systems, networks and data centers are exposed to a constant and differing variety of attacks that expose vulnerabilities of such systems in order to compromise their security and/or operation. As an example, various forms of malicious software program attacks include viruses, worms, Trojan horses and the like that computer systems can obtain over a network such as the Internet. Quite often, users of such computer systems are not even aware that such malicious programs have been obtained within the computer system. Once resident within a computer, a malicious program that executes might disrupt operation of the computer to a point of inoperability and/or might spread itself to other computers within a network or data center by exploiting vulnerabilities of the computer's operating system or resident application programs. Other malicious programs might operate within a computer to secretly extract and transmit information within the computer to remote computer systems for various suspect purposes. As an example, spyware is a form of software that can execute in the background (e.g., unbeknownst to users) of a computer system and can perform undesirable processing operations such as tracking, recording and transmitting user input from the spyware-resident computer system to a remote computer system. Spyware can allow remote computes to silently obtain otherwise confidential information such as usernames and passwords required to access protected data, lists, contents of files or even remote web sites user account information.

Computer system developers, software developers and security experts have created many types of conventional preventive measures that operate within conventional computer systems in an attempt to prevent operation of malicious programs from stealing information or from compromising proper operation of the computer systems. As an example, conventional virus detection software operates to periodically download a set of virus definitions from a remotely located server. Once the virus detection software obtains the definitions, the security software can monitor incoming data received by the computer system, such as email messages containing attachments, to identify viruses defined within the virus definitions that might be present within the data accessed by the computer. Such data might be obtained over a network or might be unknowingly resident on a computer readable medium, such as a disk or CD-ROM that a user inserts into the computer. Upon detection of inbound data containing a virus or other malicious program, the virus detection software can quarantine the inbound data so that a user of the computer system will not execute code or access the data containing the detected virus that might result in compromising the computer's operation.

Other examples of conventional malicious attacks, intrusions, or undesirable processing that can cause problems within computer systems or even entire computer networks include virus attacks, worm attacks, trojan horse attacks, denial-of-service attacks, a buffer overflow operations, execution of malformed application data, and execution of malicious mobile code. Virus attacks, worm attacks, and trojan horse attacks are variants of each other that generally involve the execution of a program, for which a user often is unaware of its existence, that performs some undesired processing operations to comprise a computer's proper operation. A denial-of-service attack operates to provide an intentional simultaneous barrage of packets (e.g., many connection attempts) emanating from many different computer systems to one or more target computer systems, such as a web site, in order to intentionally cause an overload in processing capabilities of the target computer resulting in disruption of service or a business function provided by the target computer. Denial of Service attacks may also seek to crash the targeted machine (rather than simply consume resources). Buffer overflow attacks occur when programs do not provide appropriate checks of data stored in internal data structures within the software that result in overwriting surrounding areas of memory. Attacks based on buffer overflows might allow an attacker to execute arbitrary code on the target system to invoke privileged access, destroy data, or perform other undesirable functions. Malformed application data attacks might result in an application containing a code section that, if executed, provides access to resources that would otherwise be private to the application. Such attacks can expose vulnerabilities due to an incorrect implementation of the application, for example by failing to provide appropriate data validity checks, or allowing data stream parsing errors, and the like.

Many of the conventional malicious programs and mechanisms for attack of computer systems, such as viruses and worms, include the ability to redistribute themselves to other computer systems or devices within a computer network, such that several computers become infected and experience the malicious processing activities discussed above. Some conventional attempts to prevent redistribution of malicious programs include implementing malicious program detection mechanisms such as virus detection software within firewalls or gateways between different portions of networked computer systems in order to halt propagation of malicious programs to sub-networks.

SUMMARY

Conventional technologies for providing computer security suffer from a variety of deficiencies. In particular, conventional technologies for providing computer security are limited in that conventional security software programs rely on the ability to periodically remotely receive information such as virus definitions that allow the conventional security software programs to identify and quarantine malicious programs. Many of the most common conventional forms of security software such as virus definitions programs rely upon obtaining the periodic virus definition updates from a centralized server accessed over the Internet that is maintained by the vendor of the security software. As a result, the most recent virus definition updates only reflects those viruses that have been recently detected, fingerprinted in inserted into the virus definition file by the vendor of that maintains and distributes the virus definition files.

Because conventional security software programs require periodic updates, such conventional security software programs are only as good as the most recent updates of the malicious program definitions (e.g., virus definitions) that individual instances of the conventional protection software have been able to receive. As an example, conventional virus detection software will not recognize viruses created and transmitted to a computer system that have not yet been identified and/or defined within the most recent update of a set of virus definitions obtained from a remote server. Accordingly, the malicious program code or data not defined within the most recent virus definitions update may be successfully inserted and executed within computer systems in a network in order to perform some of the malicious processing discussed above, even though such systems are equipped with conventional security software (i.e., virus detection software).

As a result, conventional security software program implementations are often several steps behind the prevention and spread of new attacks that are constantly being created and disseminated by malicious program developers. This problem is compounded by the fact that modern malicious programs are able to distribute themselves quickly to hundreds or thousands of computer systems on a network such as the Internet within a short amount of time, such as several hours, whereas most conventional security software only obtains updates on a less frequent basis, such as nightly.

Embodiments disclosed herein significantly overcome such deficiencies and provide a system that includes a probabilistic security policy re-posturing process. The probabilistic security policy re-posturing process rapidly identifies malicious attacks and prevents the spread of such attacks to other computer systems. In effect, embodiments disclosed herein provide for a self-healing computer network system. Embodiments disclosed herein include one or more security agents that operate within individual host computer systems in a network. The security agents can interact with a management center to obtain a security policy that contains a set of rules that indicate types of operations that may be allowed or disallowed within computer system. Once a security agent has obtained the security policy, the security agent operates a plurality of security interceptors that can watch over and monitor processing operations performed by various software and hardware components within the host computer system that that security agent protects. The security agent provides security to a computerized device by detecting processing outcomes produced via operation of a sequence of related processing operations within the computerized device. As an example, processing operations related to an inbound connection to a Web server can be monitored by various interceptors operating within different parts of the computer system's operating system and application layer code in order to detect the related sequence of processing operations that the inbound Web server connection attempt triggers. Each interceptor detects a specific event and transfers that event to an event correlation engine that records the processing outcomes and the sequence of related processing operations in a security history. The event correlation engine identifies a security violation when one of the detected processing operations in the security history produces a processing outcome that violates a security policy. This may be before, during or after occurrence of an undesired processing outcome within computer system such as a system crash, system error, protection violation, process disruption or other such undesired action as defined within the security policy. The security agent is then able to subsequently detect attempted performance of a similar sequence of related processing operations that attempt to produce at least one processing outcome that violates the security policy. In response, the security agent denies operation of at least a portion of the sequence of related processing operations within the computerized device to avoid violation of the security policy. The security agents can also mark or otherwise identify sequences of processing operations that led up to the security violation as a disallowed sequence of processing operations and can disseminate this information to other security agents operating on other host computer systems in the network in real-time (e.g., upon detection) in order to spread the knowledge of the behavior or processing pattern that the malicious attack attempted to perform on the computer system the detected the attack, so that other computer systems will not be vulnerable to the attack.

Embodiments disclosed herein include a computer system executing a probabilistic security policy re-posturing process. The probabilistic security policy re-posturing process defines a set of key events to be monitored by at least one agent. The probabilistic security policy re-posturing process creates a graphical model, such as a Bayesian Network, for the set of key events. The probabilistic security policy re-posturing process observes the set of key events. In one embodiment, the set of key events are related to each other. In another embodiment, the set of key events are not related to each other. In yet another embodiment, the set of key events have a causal relationship with each other. The key events are observed, and inputted into the Bayesian Network. Using the resulting data, the probabilistic security policy re-posturing process infers a degree of security attack on the computer system, and adjusts the security policy accordingly.

Embodiments disclosed herein include a computer system executing a probabilistic security policy re-posturing process. The probabilistic security policy re-posturing process defines at least one key event to be monitored by at least one agent, and creates a creating a graphical model for the at least one key event. The probabilistic security policy re-posturing process observes the at least one key event, and infers a degree of attack on the computer system based on an observation of the at least one key event in conjunction with a result of an effect the at least one key event has on the graphical model. The probabilistic security policy re-posturing process then adjusts a security policy based on an output of the graphical model.

During an example operation of one embodiment, suppose the probabilistic security policy re-posturing process is monitoring a computer system. The probabilistic security policy re-posturing process defines a set of key events, including, for example, a buffer overflow, and creates a graphical model, such as a Bayesian Network, that infers a degree of probability of an attack on the computer system, based on the occurrence of a buffer overflow. The probabilistic security policy re-posturing process observes the activity on the computer system, and detects an occurrence of a buffer overflow. The probabilistic security policy re-posturing process infers a degree of attack on the computer system, for example, fifty percent, based on the buffer overflow, and the result of inputting the instance of the buffer overflow into the Bayesian Network. Based on the probability that there is an attack on the computer system, the probabilistic security policy re-posturing process adjusts the security policy on the computer system. In one embodiment, the security policies of other computer systems also protected by the probabilistic security policy re-posturing process are also adjusted.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 illustrates a flowchart of a procedure performed by the system of FIG. 1 when the probabilistic security policy re-posturing process creates a graphical model for the at least one key event, such as a Bayesian network, for use in detecting the degree of attack on the computer system, according to one embodiment disclosed herein.

FIG. 6 illustrates a flowchart of a procedure performed by the system of FIG. 1 when the probabilistic security policy re-posturing process observes the at least one key event, according to one embodiment disclosed herein.

FIG. 7 illustrates a flowchart of a procedure performed by the system of FIG. 1 when the probabilistic security policy re-posturing process infers a degree of attack on the computer system based on an observation of the at least one key event in conjunction with a result of an effect the at least one key event has on the graphical model, according to one embodiment disclosed herein.

DETAILED DESCRIPTION

Embodiments disclosed herein include a computer system executing a probabilistic security policy re-posturing process. The probabilistic security policy re-posturing process defines a set of key events to be monitored by at least one agent. The probabilistic security policy re-posturing process creates a graphical model, such as a Bayesian Network for the set of key events. The probabilistic security policy re-posturing process observes the set of key events. In one embodiment, the set of key events are related to each other. In another embodiment, the set of key events are not related to each other. In yet another embodiment, the set of key events have a causal relationship with each other. The key events are observed, and inputted into the graphical model. Using the resulting data, the probabilistic security policy re-posturing process infers a degree of security attack on the computer system, and adjusts the security policy accordingly.

Embodiments disclosed herein include a computer system executing a probabilistic security policy re-posturing process. The probabilistic security policy re-posturing process defines at least one key event to be monitored by at least one agent, and creates a creating a graphical model for the at least one key event. The probabilistic security policy re-posturing process observes the at least one key event, and infers a degree of attack on the computer system based on an observation of the at least one key event in conjunction with a result of an effect the at least one key event has on the graphical model. The probabilistic security policy re-posturing process then adjusts a security policy based on an output of the graphical model.

Figure 1:
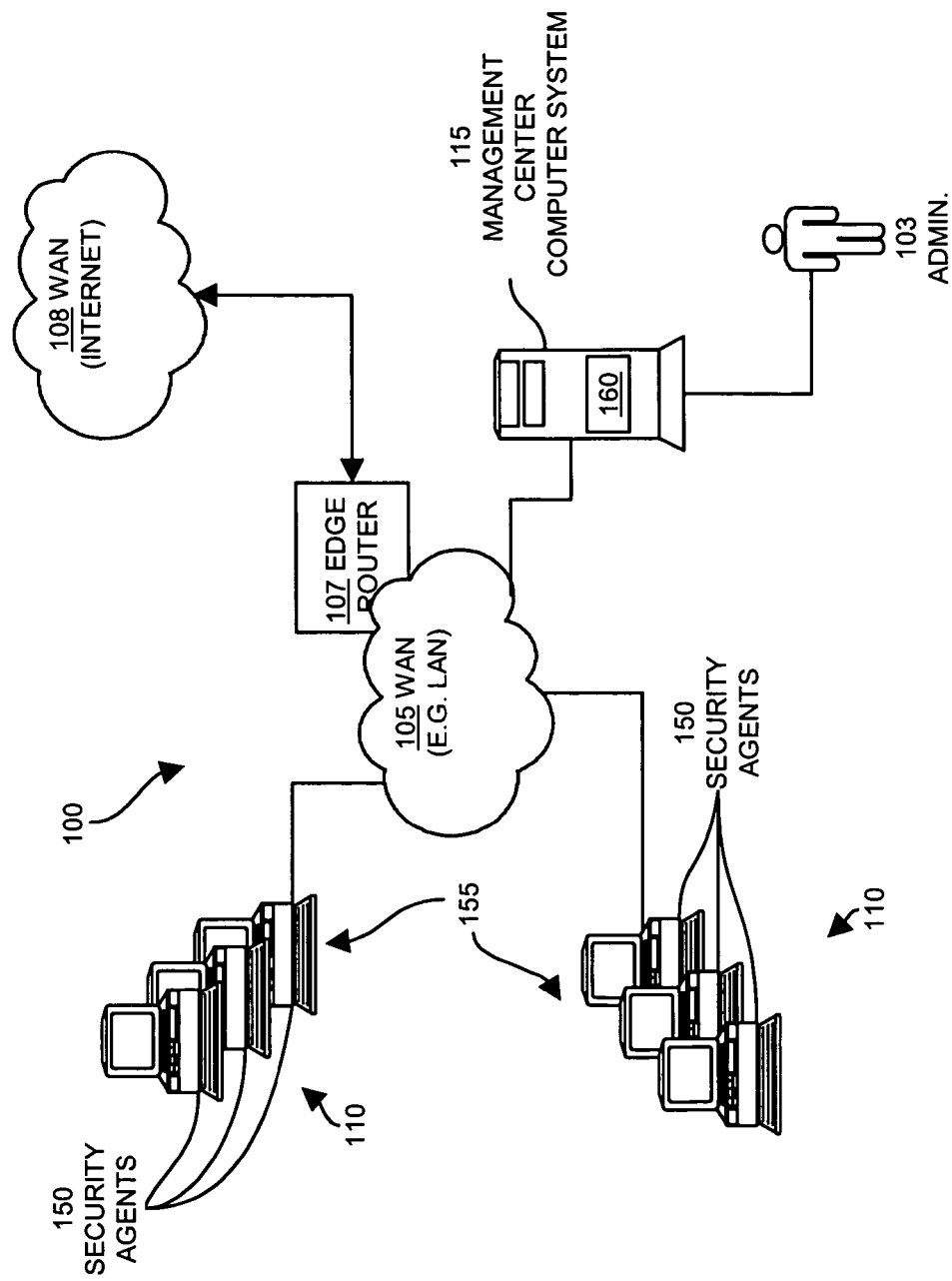
FIG. 1 illustrates an example configuration of a network environment that includes a security system configured as disclosed herein.

FIG. 1 illustrates an example computer networking environment 100 suitable for use in explaining example embodiments disclosed herein. The computer networking environment 100 includes a computer network 105 such as a local area network (LAN) that interconnects a security management computer system 115, an edge router 107 and a plurality of host computer systems 110, each of which operates (e.g., executes, runs, interprets or otherwise performs) a agent 150 configured as disclosed herein. Each agent 150 is running an instance of the probabilistic security policy re-posturing process 155. The security management computer system 115 also operates a management center application 160 that operates as disclosed herein. The edge router 107 couples the network 105 to a wide area network (WAN) 108 such as the Internet that allows communication between the computer systems 110, 115 and other computers worldwide. Note that the management center computer 115 may be isolated form the WAN 108 by a firewall that is not shown in this example.

The host computers 110 may be any type of computer system, workstation, server (e.g., web server), personal computer, laptop, mainframe, personal digital assistant device, general purpose or dedicated computing device or the like that operate any type of software, firmware or operating system. They may be physically or wirelessly coupled to the network 105 to support communications. The security agents 150 and management center application 160 operate to dynamically detect and prevent malicious attacks on the computers 110 without requiring the security agents 150 to continuously and periodically download signature or virus definition files. Generally, an administrator 103 installs the security agents 150 (including the probabilistic security policy re-posturing process 155) on the computer systems 110 that are to be protected and they are responsible for enforcing the appropriate security policy on those systems.

The security agents 150 (including the probabilistic security policy re-posturing process 155) have the ability to learn what causes security violations such as malicious attacks by monitoring, analyzing and recording processing behavior and events of the computer system 110 that occur prior to the security violation taking place, in order to prevent such events from occurring in the future. In other words, the security system disclosed herein in able to monitor and record processing behavior that results in an undesired processing operation such as a process exception, system crash or the like and is able to analyze recorded processing operations that led up to undesired operation or problem to identify the root cause of the failure. Once identified, the security system is able to prevent that single operation or sequence of processing operations identified as the root cause of failure from executing again on that or other computer system in order to avoid further security violations and to prevent such attacks on other computers. A security agent as disclosed herein can thus learn of new types of malicious attacks without having seen processing that causes such attacks in the past, and can prevent that attack in the future. The ability to learn of processing associated with a new attack, identify its root cause, and prevent it from happening in the future can occur without external input (e.g., virus definition files) being received by a computer system equipped with the security agent.

Security agent operation as explained herein includes being preprogrammed with certain known security violations in a rule-based security policy and preventing them from happening even a first time. In addition, such processing also involves recording and post-processing security history event data that result in a security violation (i.e., that was not preprogrammed and thus unrecognizable a first time) to identify a root cause (e.g., one or more processing operations or events) of the security violation within the computer system in order to prevent it from happening a second time. This can involve performing a local comparison of several security histories collected by a agent 150 in a single computer system 110 to identify a common pattern of processing activity that results in an undesirable processing outcome (i.e., a security violation). The security agents 150 can also transmit event and security history information to the management center 115.

The management center 115 acts as a central repository for all event log records generated by the security agents 150 and provides functions for monitoring and reporting. The management center 115 also correlates event records generated from security agents 150 operating on different computer systems 110 for purposes of detecting suspicious activity in the network.

Figure 2:
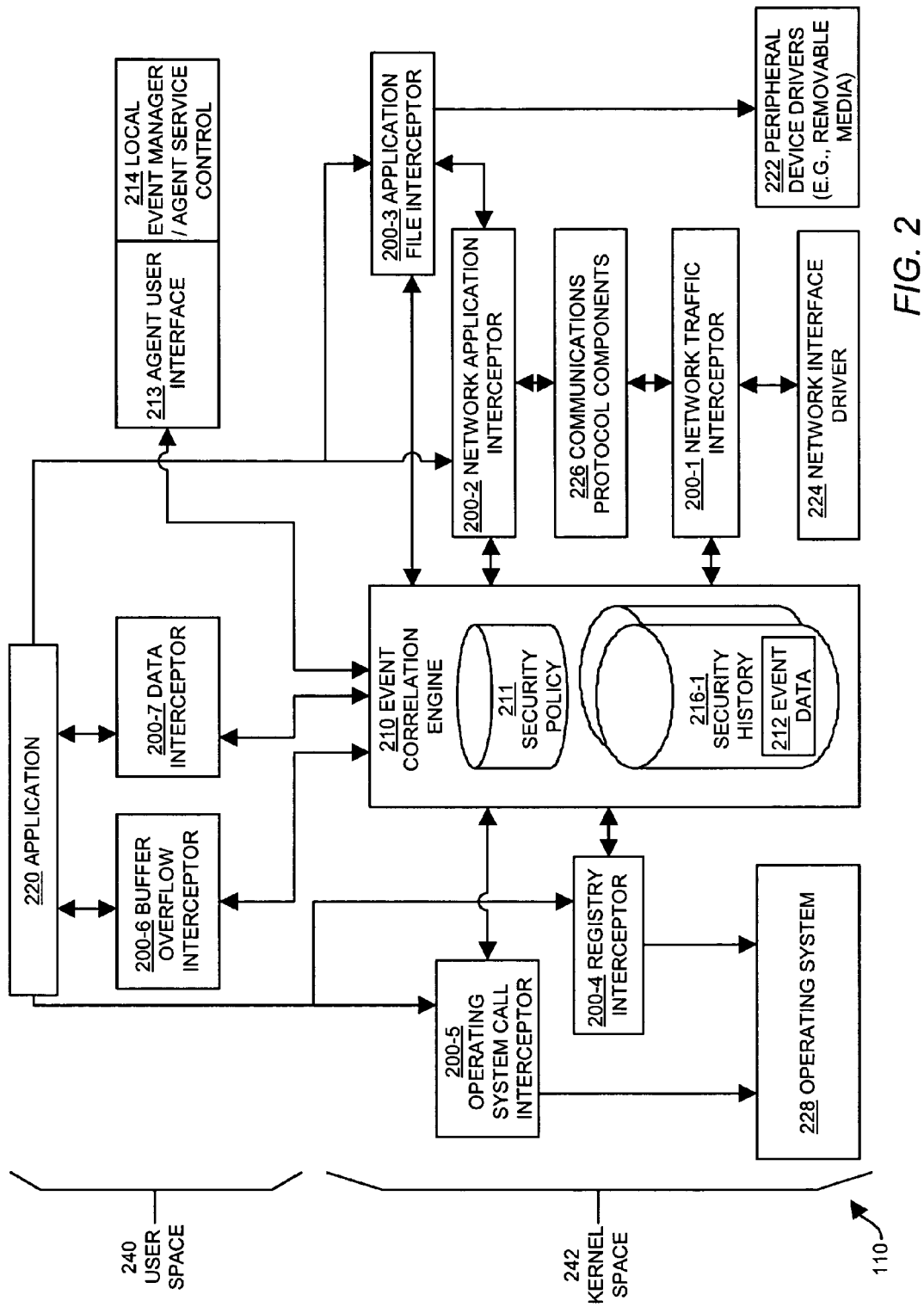
FIG. 2 illustrates example architecture of the computerized device configured with a security system in one example configuration.

FIG. 2 illustrates an architecture of a host computer system 110 configured with a security agent in accordance with one example embodiment. The security agent components include a plurality of security interceptors 200-1 through 200-7 including, for example, a network traffic interceptor 200-1, the network application interceptor 200-2, a file interceptor 200-3, a registry interceptor 200-4, a system call interceptor 200-5, a buffer overflow interceptor 200-6 and a data interceptor 200-7. The agent 150 in this example configuration also includes an event correlation engine 210, a security agent user interface 213, and local event manager 214. The event correlation engine 210 stores a security policy 211 that contains rules that are used to instruct the agent 150 to protects the computer 110 on which it operates by interpreting and enforcing the rules to restrict the operations that may be performed by that computer 110. An administrator 103 uses the management center application 160 to create and distribute security policies to each computer system 110 to be protected.

In one configuration, the network traffic interceptor 200-1 resides between a communications protocol component 226 (such as a TCP driver), and the network interface card 224 or other communications interface. The network traffic interceptor 200-1 looks at packets coming from the network before they get to the native operating system TCP stack and can detect malicious operations or instructions such as a remote computer scanning the computer system 110. Such attacks can include, for example, a ping of death attack, a TCP SYN flood attack, port scanning attacks and so froth. Other security interceptors 200 can include packet interceptors, connection interceptors, file sharing interceptors, data filter interceptors, registry interceptors, system call interceptors, and the like. The interceptors 200 can be installed and executed by using, for example, windows registry keys that create dependencies on standard Operating Systems (OS) dynamically linked libraries (dlls) so that the interceptor dlls 200 are loaded along with the appropriate windows dlls that they monitor. The interceptors can thus serve as wrappers to monitor processing operations of all calls made to any specific computer components.

This example configuration also includes several components that operate within the computer system 110 that are not part of the security agent architecture itself In particular, this example configuration includes one or more software applications 220 that execute within a user space 240 within the computer system 110. The computer system 110 further operates several components in kernel space 242 such as one or more device peripheral device drivers 222, a network interface driver 224, communications protocol components 226, and an operating system 228. It is to be understood that the components 222 through 228 are illustrated as separate for purposes of description of operations disclosed herein, and that they may be combined together, such as an operating system that includes device drivers 222 and communication protocol components 226.

Generally, according to operations of embodiments disclosed herein, the interceptors 200 monitor processing activities and collect and report event data 212 to the event correlation engine 210 for the respective standard processing components 220 through 228 within the user and kernel spaces 240 and 242. The event correlation engine 210 stores the event data within one or more security histories 216. Event data 212 can include things such as the identification of new connection requests made to the network interface driver 224, as detected by the network traffic interceptor 200-1. As another example, the application file interceptor 200-2 can identify a processing activity such as an application 220 accessing a particular file via an operating system call and report this as event data 212 to the event correlation engine 210. There may be other interceptors 200 besides those illustrated in FIG. 2 and thus the interceptors 201 through 206 are shown by way of example only. The event correlation engine 210 correlates the event data 212 against the security policy 211 in order to provide an indication to the interceptors 200 of whether or not the processing activity associated with the event data should be allowed. The event correlation engine 210 can also instruct the interceptors 200 to collect more or less event data 212 as needed. By being able to track operations, in the event of an undesirable processing operation, the behavior of the computer system 110 can be analyzed and the series of events that took place that lead up the undesirable processing operation can be "fingerprinted" and marked so that if they occur again, they can be prevented prior to their full execution. In addition, by recording traces from multiple failures and determining a commonality between them, if several computer systems suffer similar attacks, a commonality between the attacks can be identified and prevented in the future, even in situations where the attacking program morphs its identity or changes it content.

Further details of configurations explained herein will now be provided with respect to a flow chart of processing steps that show the high level operations disclosed herein.

Figure 3:
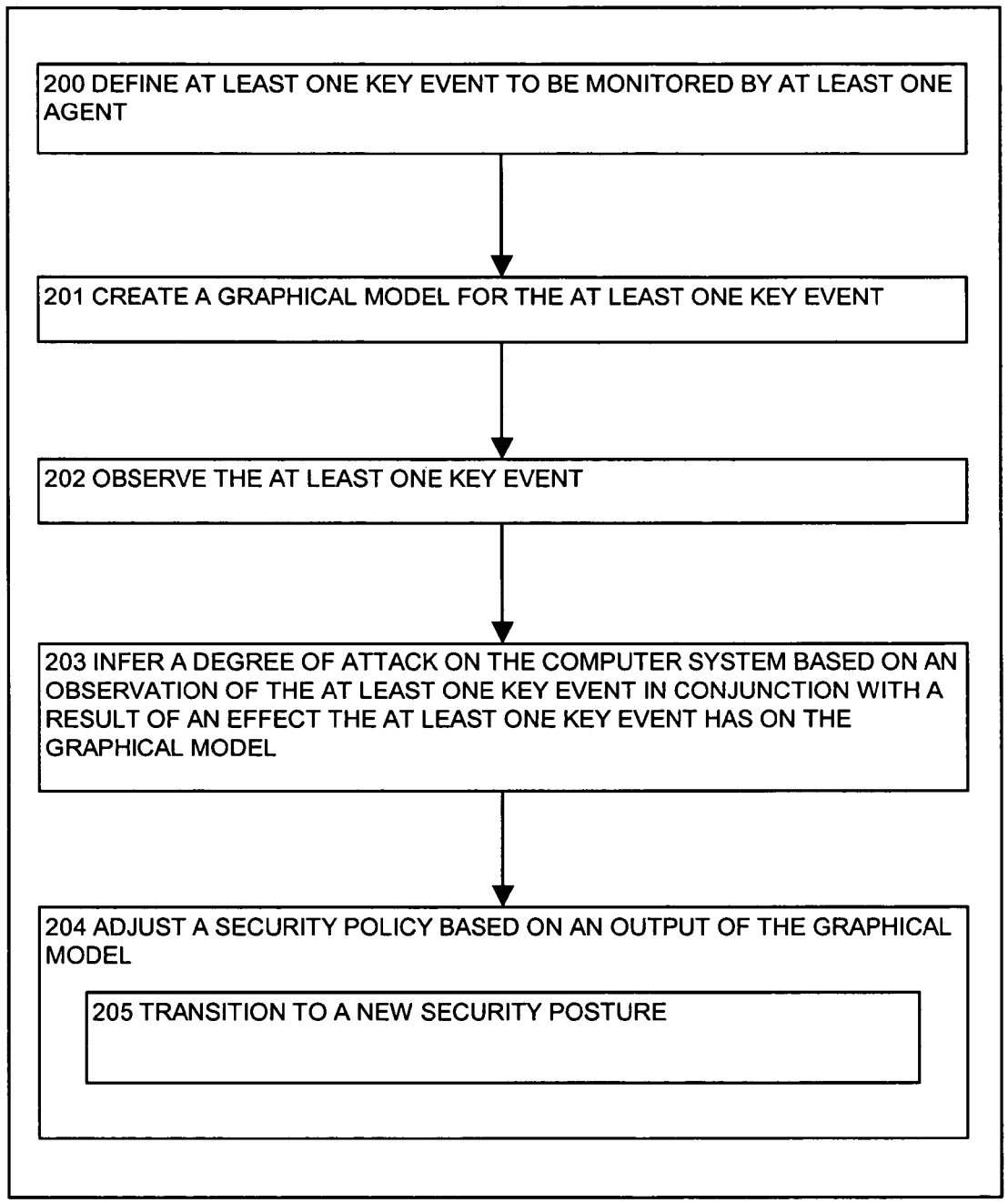
FIG. 3 illustrates a flowchart of a procedure performed by the system of FIG. 1 when the probabilistic security policy re-posturing process defines at least one key event to be monitored by at least one agent, according to one embodiment disclosed herein.

FIG. 3 is a flowchart of the steps performed by the probabilistic security policy re-posturing process 155 when it defines at least one key event to be monitored by at least one agent 150.

In step 200, the probabilistic security policy re-posturing process 155 defines at least one key event to be monitored by at least one agent 150. In an example configuration, the probabilistic security policy re-posturing process 155 defines a set of key events to be monitored by an agent 150. The set of key events are defined, for example, with help of group of top security experts/analysts. The probabilistic security policy re-posturing process 155 hooks key processing points for both the computer system, and applications executing on the computer system. The processing points are defined as potential security enforcement points, for example, invoking another application, modifying the system configuration, etc. The processing points can also include detection points, for example, process exception handling, Buffer Overflow detection, etc. In an example embodiment, a subset of these observation points are used to probabilistically determine if an attack on a computer system is in progress or malware is executing locally on the computer system.

In step 201, the probabilistic security policy re-posturing process 155 creates a graphical model for the at least one key event. In an example configuration, for every key event defined, the probabilistic security policy re-posturing process 155 creates a graphical model, such as a directed graphical model, that identifies casual relations between the monitored events. When network is created, initial subjective probabilities are defined using expert opinions, and available supporting statistical data of past attacks on computer systems. In an example configuration, the probability of an attack on the computer system increases (or possibly decreases) based upon observation of the key events. In an example embodiment, the graphical model represents a set of events wherein distinct subsets are assigned a probability.

In step 202, the probabilistic security policy re-posturing process 155 observes the at least one key event. In an example configuration, the agent 150, executing the probabilistic security policy re-posturing process 155, monitors events on the computer system. As events occur, the probabilistic security policy re-posturing process 155 identifies key events that could be an indication of a security attack on the computer system. In an example configuration, the probabilistic security policy re-posturing process 155 observes a key event, such as an instance of a software application being installed on the computer system.

In step 203, the probabilistic security policy re-posturing process 155 infers a degree of attack on the computer system, based on an observation of the at least one key event, in conjunction with a result of an effect the at least one key event has on the graphical model. In an example configuration, the probabilistic security policy re-posturing process 155 observes a set of key events occurring on the computer system. The key events observed by the probabilistic security policy re-posturing process 155, can be compiled in sequence, or compiled as a set of key events, yielding different probabilities of an attempted attack on the computer system. For example, the probabilistic security policy re-posturing process 155 detects a process exception. The probabilistic security policy re-posturing process 155 may have assigned the process exception a probability of, for example, five percent, within the graphical model. In this example, a process exception could merely be the result of a poorly written application. In this same example, the probabilistic security policy re-posturing process 155 detects code executing from a buffer. Code executing from a buffer may indicate a buffer overflow attack, but it could also easily be licensing code being executed. Thus, the probabilistic security policy re-posturing process 155 assigns code executing from a buffer a low probability of being an exploit, for example, twenty five percent. However, when the probabilistic security policy re-posturing process 155 observes both the process exception and a buffer overflow, the graphical model tabulates these two occurrences as suspicious, and assigns the probability of an attack on the computer system to a higher percentage, for example ninety percent. In an example embodiment, the probabilistic security policy re-posturing process 155 identifies a threshold associated with an attack on the computer system. Once the result of the observed key events, in conjunction with the output of the graphical model surpasses a specified threshold, the probabilistic security policy re-posturing process 155 indicates that an attack on the computer system is likely.

In step 204, the probabilistic security policy re-posturing process 155 adjusts a security policy based on an output of the graphical model. In an example configuration, the probabilistic security policy re-posturing process 155 identifies a degree of attack on the compute system based on observed key events in conjunction with the graphical model. In response, the probabilistic security policy re-posturing process 155 modifies the security policy. As the threat of attack increases, tighter security policies can be employed. Likewise, as the threat of attack decreases, the security policies can be relaxed.

In step 205, the probabilistic security policy re-posturing process 155 transitions to a new security posture. In an example configuration, the probabilistic security policy re-posturing process 155 defines security postures. An example of a security posture may be, "when an attack on the computer system is detected, and the result of the graphical model indicates the probability of an attack exceeds seventy percent, deny all new network connections". Thus, when the probabilistic security policy re-posturing process 155 identifies an attack on the computer system, the probabilistic security policy re-posturing process 155 transitions to a new security posture. That new security posture may tighten or relax the level of security on the computer system.

Figure 4:
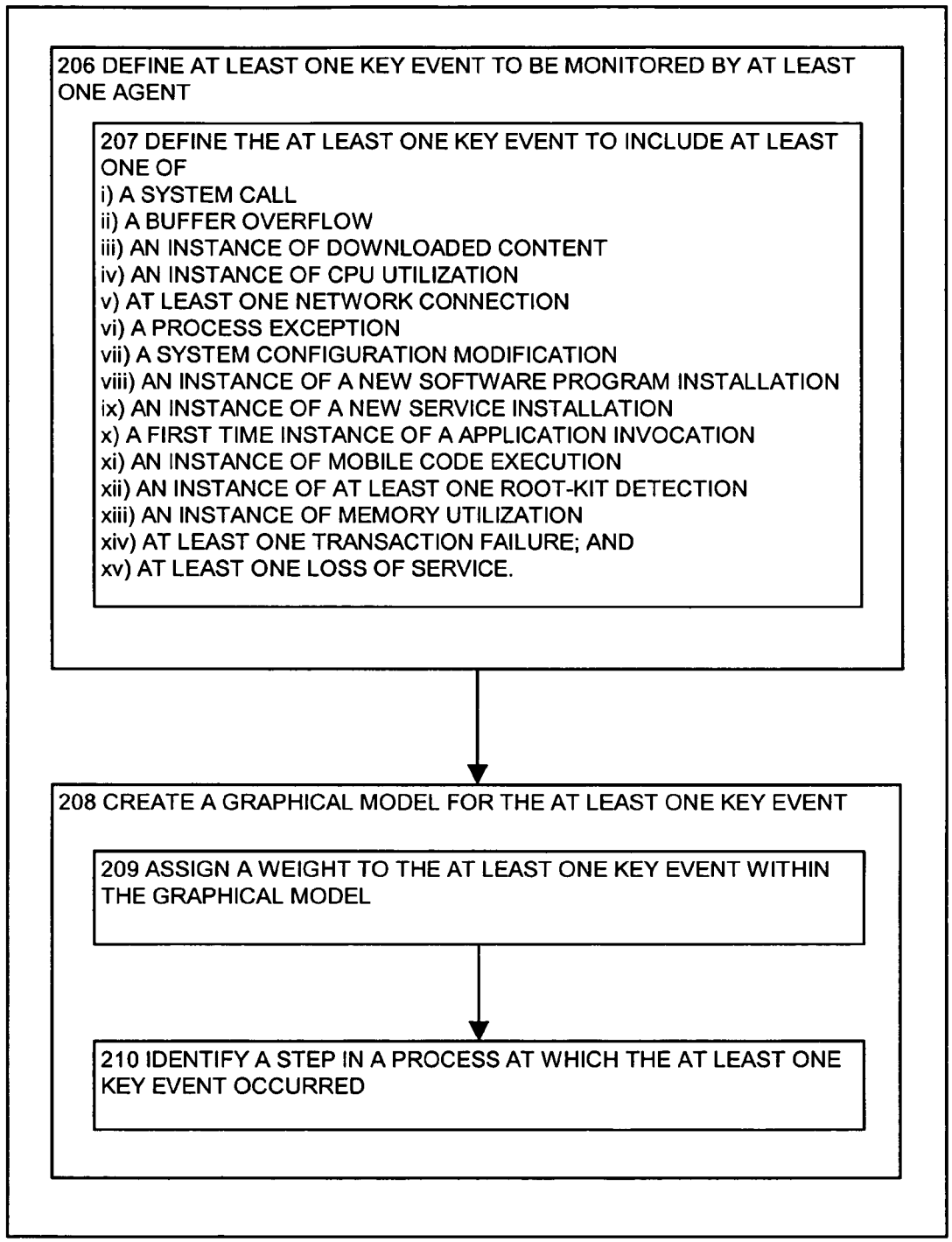
FIG. 4 illustrates a flowchart of a procedure performed by the system of FIG. 1 when the probabilistic security policy re-posturing process defines at least one key event to be monitored by at least one agent, and creates a graphical model for the at least one key event, according to one embodiment disclosed herein.

FIG. 4 is a flowchart of the steps performed by the probabilistic security policy re-posturing process 155, when it defines at least one key event to be monitored by at least one agent 150, and creates a graphical model for the at least one key event.

In step 206, the probabilistic security policy re-posturing process 155 defines at least one key event to be monitored by at least one agent 150. In an example configuration, the probabilistic security policy re-posturing process 155 defines a set of key events to be monitored by an agent 150. The probabilistic security policy re-posturing process 155 hooks key processing points for both the computer system and applications executing on the computer system. In another example configuration, more than one agent 150 can monitor the set of key events. Examples of key events are detailed in sub step 207.

In step 207, the probabilistic security policy re-posturing process 155 defines the at least one key event to include at least one of:
  i) a system call
  ii) a buffer overflow
  iii) an instance of downloaded content
  iv) an instance of CPU utilization
  v) at least one network connection
  vi) a process exception
  vii) a system configuration modification
  viii) an instance of a new software program installation
  ix) an instance of a new service installation
  x) a first time instance of a application invocation
  xi) an instance of mobile code execution
  xii) an instance of at least one root-kit detection
  xiii) an instance of memory utilization
  xiv) at least one transaction failure and
  xv) at least one loss of service.

Other system events can be defined as key events.

In step 208, the probabilistic security policy re-posturing process 155 creates a graphical model for the at least one key event. In an example embodiment, the probabilistic security policy re-posturing process 155 identifies a set of key events. The probabilistic security policy re-posturing process 155 then creates a graphical model for the set of key events. For example, the probabilistic security policy re-posturing process 155 creates a graphical model that infers an attack is occurring on the computer system if a process exception, a buffer overflow, and high CPU utilization occur at the same time on the computer system.

In step 209, the probabilistic security policy re-posturing process 155 assigns a weight to the at least one key event within the graphical model. In an example embodiment, the probabilistic security policy re-posturing process 155 identifies a set of key events. The probabilistic security policy re-posturing process 155 then creates a graphical model for the set of key events, and assigns a weight to each of the key events within the graphical model. For example, the probabilistic security policy re-posturing process 155 may assign a weight of a five percent chance of an attack on the computer system if the probabilistic security policy re-posturing process 155 observes an instance of a new software application installation. The probabilistic security policy re-posturing process 155 may assign a weight of fifteen percent chance of an attack on the computer system if the probabilistic security policy re-posturing process 155 observes high CPU utilization. The probabilistic security policy re-posturing process 155 may assign a weight of a fifty percent chance of an attack on the computer system if the probabilistic security policy re-posturing process 155 observes an instance of a new software installation, and high CPU utilization on the computer system. However, the probabilistic security policy re-posturing process 155 may only assign a weight of a twenty five percent chance of an attack on the computer system if the probabilistic security policy re-posturing process 155 observes an instance of a new software installation, and a process exception on the computer system.

In step 210, the probabilistic security policy re-posturing process 155 identifies a step in a process at which the at least one key event occurred. In an example embodiment, the probabilistic security policy re-posturing process 155 creates a graphical model for the set of key events, and assigns a weight to each key event, based on the step in the process at which the key event occurred. For example, a modification to a system configuration that occurs after a first time invocation of a software application is more likely to be a security attack on the computer system than a modification to a system configuration that occurs before a first time invocation of a software application. Thus, the probabilistic security policy re-posturing process 155 identifies the step in the process at which the key event occurs, and assigns a weight to that key event (within the graphical model), based on the step in the process at which the key event occurs.

FIG. 5 is a flowchart of the steps performed by the probabilistic security policy re-posturing process 155, when it creates a graphical model for the at least one key event.

In step 211, the probabilistic security policy re-posturing process 155 creates a graphical model for the at least one key event. In an example configuration, for every key event defined, the probabilistic security policy re-posturing process 155 creates a graphical model, such as a directed graphical model, that identifies casual relations between the monitored events.

In step 212, the probabilistic security policy re-posturing process 155 creates a Bayesian network for use in detecting the degree of attack on the computer system. In an example configuration, the probabilistic security policy re-posturing process 155 creates a directed graphical model, such as a Bayesian Network to detect a degree of attack on the computer system. A Bayesian Network is a technique from the field of artificial intelligence that calculates probability based on a group of related or influential signs. The probabilistic security policy re-posturing process 155 identifies a set of key events, and assigns weights to key event for use with the Bayesian Network.

As the probabilistic security policy re-posturing process 155 observes the key events occurring on the computer system, the Bayesian Network is used to compute the degree of attack on the computer system.

Alternatively, in step 213, the probabilistic security policy re-posturing process 155 creates at least one subjective initial probability for each node in a plurality of nodes within the graphical model. In an example embodiment, the probabilistic security policy re-posturing process 155 creates a graphical model for use in detecting attacks on the computer system. When network is created, the probabilistic security policy re-posturing process 155 defines initial subjective probabilities using expert opinions, and available supporting statistical data of past attacks on computer systems. The initial subjective probabilities are defined for each node on the graphical model defined by the probabilistic security policy re-posturing process 155.

In step 214, the probabilistic security policy re-posturing process 155 adjusts the at least one subjective initial probability of at least one node within the plurality of nodes, using at least one statistical datum associated with a previous security attack. The probability of an attack on the computer system increases (or possibly decreases) based upon observation of the key events. Thus, in an example configuration, the probabilistic security policy re-posturing process 155 adjusts the subjective initial probabilities using statistical data associated with previous security attacks on the computer system.

FIG. 6 is a flowchart of the steps performed by the probabilistic security policy re-posturing process 155, when it observes the at least one key event.

In step 215, the probabilistic security policy re-posturing process 155 observes the at least one key event. In an example configuration, the agent 150, executing the probabilistic security policy re-posturing process 155, monitors events on the computer system. As events occur, the probabilistic security policy re-posturing process 155 identifies key events that could be an indication of a security attack on the computer system. In an example configuration, the probabilistic security policy re-posturing process 155 observes a key event, such as an instance of a software application being installed on the computer system.

In step 216, the probabilistic security policy re-posturing process 155 detects the at least one key event is associated with a set of key events. In an example configuration, the probabilistic security policy re-posturing process 155 detects a single key event. The probabilistic security policy re-posturing process 155 then determines the single key event is associated with a set of key events. The association of the single key event with the set of key events provides the probabilistic security policy re-posturing process 155 with additional information that may help in determining whether an attack is occurring on the computer system, and may also help the probabilistic security policy re-posturing process 155 determine the root cause of the attack (if any) on the computer system.

In step 217, the probabilistic security policy re-posturing process 155 identifies the at least one key event is related to the set of key events. In an example configuration, the probabilistic security policy re-posturing process 155 detects a single key event, and then determines the single key event is associated with a set of key events. For example, the probabilistic security policy re-posturing process 155 detects an unfamiliar system call (i.e., the single key event), and a buffer overflow and process exceptions (i.e., a set of key events). The probabilistic security policy re-posturing process 155 determines that the unfamiliar system call (i.e., the single key event) is related to the buffer overflow and process exceptions (i.e., a set of key events) in that the buffer overflow and process exceptions (i.e., a set of key events) occurred after the unfamiliar system call (i.e., the single key event) occurred. Thus, the probabilistic security policy re-posturing process 155 determines a cause and effect between the unfamiliar system call (i.e., the single key event) and the buffer overflow and process exceptions (i.e., a set of key events). In one example embodiment, the set of key events is an ordered set of key events. In another example embodiment, the set of key events is an unordered set of key events.

Alternatively, in step 218, the probabilistic security policy re-posturing process 155 identifies the at least one key event is not related to the set of key events. In an example configuration, the probabilistic security policy re-posturing process 155 detects a single key event, and then determines the single key event is not associated with a set of key events. For example, the probabilistic security policy re-posturing process 155 detects high CPU utilization (i.e., the single key event), and several network connections (i.e., a set of key events). The probabilistic security policy re-posturing process 155 determines that high CPU utilization (i.e., the single key event) is not related to the instance of several network connections (i.e., a set of key events). Thus, the probabilistic security policy re-posturing process 155 determines that while high CPU utilization (i.e., the single key event) and the instance of several network connections (i.e., a set of key events) may potentially be separate instances of an attack on the computer system, they are not related to the (potentially) same attack on the computer system.

Alternatively, in step 219, the probabilistic security policy re-posturing process 155 observes an order of the set of key events, the order including a placement of the at least one key event within the order of the set of key events. In an example configuration, the probabilistic security policy re-posturing process 155 detects a set of key events occurring. The probabilistic security policy re-posturing process 155 observes the order in which the key events occurred to determine if the occurrence of those key events indicates an attack on the computer system. For example, an instance of a first time invocation of a software application, followed by high CPU utilization, followed by several strange system calls could indicate a higher probability of an attack on the computer system. However, an instance of high CPU utilization followed by a first time invocation of a software application would indicate that the instance of high CPU utilization is an indication of a lower probability of an attack on the computer system.

FIG. 7 is a flowchart of the steps performed by the probabilistic security policy re-posturing process 155, when it infers a degree of attack on the computer system.

In step 220, the probabilistic security policy re-posturing process 155 infers a degree of attack on the computer system based on an observation of the at least one key event in conjunction with a result of an effect the at least one key event has on the graphical model. In an example configuration, the probabilistic security policy re-posturing process 155 observes key events, and applies these key events to the graphical model. The key events are weighted within the graphical model, and the resulting effect of the key events determines the degree of attack on the computer system. It is the combination of the ability to hook and intercept key events on the computer system and the graphical model (including the learning abilities of the graphical model) that provides a very unique solution to determining the degree of attack on the computer system.

In step 221, the probabilistic security policy re-posturing process 155 utilizes the Bayesian network to infer the degree of attack on the computer system. In an example embodiment, the probabilistic security policy re-posturing process 155 creates a Bayesian network for use in detecting the degree of attack on the computer system. The probabilistic security policy re-posturing process 155 creates a Bayesian Network to detect a degree of attack on the computer system, identifies a set of key events, and assigns weights to key event for use with the Bayesian Network. As the probabilistic security policy re-posturing process 155 observes the key events occurring on the computer system the Bayesian Network is used to infer the degree of attack on the computer system.

Alternatively, in step 222, the probabilistic security policy re-posturing process 155 correlates the degree of attack to a configurable limit. In an example configuration, the probabilistic security policy re-posturing process 155 weights each key event within the graphical model to determine a degree of attack on the computer system. The probabilistic security policy re-posturing process 155 correlates the degree of attack to a configurable limit, such as a percentage of probability that an attack is occurring on the computer system.

In step 223, the probabilistic security policy re-posturing process 155 initializes the configurable limit of the degree of attack. In an example embodiment, the probabilistic security policy re-posturing process 155 initializes the degree a probability of an attack on the computer system to zero. As the probabilistic security policy re-posturing process 155 observes key events, the degree a probability of an attack on the computer system is modified.

Alternatively, in step 224, the probabilistic security policy re-posturing process 155 defines the configurable limit of the degree of attack as a range of configurable limits. In an example configuration, the probabilistic security policy re-posturing process 155 defines the configurable limit of attack on the computer system as a bounded limit. In another example configuration, the probabilistic security policy re-posturing process 155 defines the configurable limit as a range of configurable limits.

Alternatively, in step 225, the probabilistic security policy re-posturing process 155 modifies the degree of attack on the computer system based on the observation of the at least one key event. In an example configuration, the probabilistic security policy re-posturing process 155 observes a set of key events. Based on the observation of the set of key events, the probabilistic security policy re-posturing process 155 modifies the degree of attack on the computer system. The probabilistic security policy re-posturing process 155 can increase or decrease the probability of an attack on the computer system based on the observation of a single key event, or a set of key events.

While the system and method have been particularly shown and described with references to configurations thereof, it will be understood by those skilled in the art that various changes in form and details may be made therein without departing from the scope of the embodiments disclosed herein encompassed by the appended claims. Accordingly, the present embodiments disclosed herein are not intended to be limited by the example configurations provided above.

What is claimed is:

1. A computerized method, comprising:
   controlling a computer to define at least one key event to be monitored by at least one agent;
   controlling the computer to create a graphical model for the at least one key event;
   controlling the computer to observe the at least one key event;
   controlling the computer to infer a degree of attack on the computer system based on an automated observation of the at least one key event in conjunction with a result of an effect the at least one key event has on the graphical mode, where controlling the computer to infer the degree of attack on the computer system comprises modifying a probability of attack on the computer system based on the observation of the at least one key event in conjunction with the result of the effect the at least one key event has on the graphical model;
   controlling the computer to monitor the output of the graphical model, the output indicating whether the probability of attack is greater than a threshold value; and
   controlling the computer to automatically adjust a security policy based on an output of the graphical model, where adjusting the security policy is performed automatically without user intervention, and where adjusting the security policy includes re-posturing a probabilistic security policy to correspond to the degree of attack;
   where the graphical model includes a plurality of nodes,
   where controlling the computer to create the graphical model for the at least one key event comprises controlling the computer to create at least one initial probability for nodes in the plurality of nodes in the graphical model and controlling the computer to adjust the at least one initial probability of at least one node in the plurality of nodes as a function of at least one statistical datum associated with a previous security attack,
   where the at least one initial probability is defined according to the probability security policy.

2. The method of claim 1, where the at least one key event comprises at least one of:
   a system call, a buffer overflow, an instance of downloaded content, an instance of CPU utilization, at least one network connection, a process exception, a system configuration modification, an instance of a new software program installation, an instance of a new service installation, a first time instance of a application invocation, an instance of mobile code execution, an instance of at least one root-kit detection, an instance of memory utilization, at least one transaction failure, and at least one loss of service.

3. The method of claim 1, where controlling the computer to create the graphical model comprises:
   assigning a weight to the at least one key event the graphical model, and identifying a step in a process at which the at least one key event occurred.

4. The method of claim 1, where controlling the computer to create the graphical model for the at least one key event comprises:
   creating a Bayesian network configured to detect the degree of attack on the computer system.

5. The method of claim 1, comprising controlling the computer to selectively deny operation of at least one operation in the computer based, at least in part, on the adjusted initial probability.

6. The method of claim 1, where controlling the computer to observe the at least one key event comprises:
   detecting that the at least one key event is associated with a set of key events.

7. The method of claim 1, where controlling the computer to infer a degree of attack on the computer system based on an observation of the at least one key event in conjunction with a result of an effect the at least one key event has on the graphical model comprises:
   controlling the computer to correlate the degree of attack to a configurable limit.

8. The method of claim 1, where automatically adjusting the security policy based on the output of the graphical model comprises:
   in response to the computer monitoring the output of the graphical model and the computer identifying that a likelihood of attack on the computer system is above the threshold value, controlling the computer to re-posture the probabilistic security policy.

9. The method of claim 4, where controlling the computer to infer a degree of attack on the computer system based on an observation of the at least one key event in conjunction with a result of an effect the at least one key event has on the graphical model comprises:
   inferring the degree of attack on the computer system based on the Bayesian network.

10. The method of claim 6, where detecting that the at least one event is associated with a set of key events comprises:
    identifying that the at least one key event is related to the set of key events.

11. The method of claim 6, where detecting that the at least one event is associated with a set of key events comprises:
    identifying that the at least one key event is not related to the set of key events.

12. The method of claim 6, where detecting that the at least one event is associated with a set of key events comprises:
    observing an order of the set of key events, the order including a placement of the at least one key event in the order of the set of key events.

13. The method of claim 7, where controlling the computer to correlate the degree of attack to a configurable limit comprises:
    initializing the configurable limit of the degree of attack.

14. The method of claim 7, where controlling the computer to correlate the degree of attack to a configurable limit comprises:
    defining the configurable limit of the degree of attack as a range of configurable limits.

15. A computer apparatus, comprising:
a memory;
a processor;
a communications interface; and
an interconnection mechanism coupling the memory, the processor and the communications interface;
the memory being encoded with an application providing probabilistic security policy re-posturing that, when performed on the processor, controls the processor to:
provide an event correlation engine in communication with an application file interceptor;
where the event correlation engine defines at least one key event to be monitored by at least one agent,
where the event correlation engine creates a graphical model for the at least one key event,
where the event correlation engine observes the at least one key event,
where the event correlation engine infers a degree of attack on the computer system based on an observation of the at least one key event in conjunction with a result of an effect the at least one key event has on the graphical model, and
where the event correlation engine adjusts a security policy based on an output of the graphical model, where adjusting the security policy includes re-posturing a probabilistic security policy to correspond to the degree of attack.

16. A computer readable medium storing computer executable instructions that when executed by a computer cause the computer to perform:
instructions for defining at least one key event to be monitored by at least one agent;
instructions for creating a Bayesian network model for the at least one key event;
instructions for observing the at least one key event;
instructions for inferring a degree of attack on the computer system based on an observation of the at least one key event in conjunction with a result of an effect the at least one key event has on the Bayesian model; and
instructions for adjusting a security policy based on an output of the graphical model, where adjusting the security policy includes re-posturing a probabilistic security policy to correspond to the degree of attack.

17. A computerized device, comprising:
a memory;
a processor;
a communications interface;
an interconnection mechanism coupling the memory, the processor and the communications interface;
the memory being encoded with a probabilistic security policy reposturing application that when executed on the processor configures the computerized device with a means for re-posturing a security policy, the means for re-posturing comprising:
means for defining at least one key event to be monitored by at least one agent;
means for inferring a degree of attack on the computer system based on an observation of the at least one key event in conjunction with a result of an effect the at least one key event has on the graphical model; and
means for adjusting a security policy based on an output of the graphical model, where adjusting the security policy includes re-posturing a probabilistic security policy to correspond to the degree of attack.

18. The computer apparatus of claim 15, wherein the memory is further encoded with instructions that when performed cause the event correlation engine to create a graphical model for the at least one key event by assigning a weight to the at least one key event of the graphical model, and identifying a step in a process at which the at least one key event occurred.

19. The computer apparatus of claim 15, wherein the memory is further encoded with instructions that when performed cause the event correlation engine to further selectively deny operation of at least one operation in the computer based, at least in part, on an adjusted initial probability.

20. The computer apparatus of claim 15, wherein the memory is further encoded with instructions that when performed cause the event correlation engine to observe the at least one key event by detect that the at least one key event is associated with a set of key events.

21. The computer apparatus of claim 20, wherein the memory is further encoded with instructions that when performed cause the event correlation engine to detect that the at least one event is associated with a set of key events by identifying that the at least one key event is related to the set of key events.

22. The computer-readable medium of claim 16, further storing instructions, which when executed by the computer, perform assigning a weight to the at least one key event of the graphical model, identifying a step in a process at which the at least one key event occurred.

23. The computer-readable medium of claim 16, further storing instructions, which when executed by the computer, perform selectively denying operation of at least one operation in the computer based, at least in part, on an adjusted initial probability.

24. The computer-readable medium of claim 16, further storing instructions, which when executed by the computer, perform detecting that the at least one key event is associated with a set of key events.

25. The computer-readable medium of claim 24, further storing instructions, which when executed cause detecting that the at least one key event is associated with a set of key events by identifying that the at least one key event is related to the set of key events.

26. The computerized device of claim 17, where the means for creating a graphical model of the at least one key event comprises means for assigning a weight to the at least one key event of the graphical model, means for identifying a step in a process at which the at least one key event occurred.

27. The computerized device of claim 17, where the means for inferring a degree of attack on the computer system further comprises means for selectively denying operation of at least one operation in the computer based, at least in part, on an adjusted initial probability.

28. The computerized device of claim 17, where the means for inferring a degree of attack one the computer system further comprises means for detecting that the at least one key event is associated with a set of key events.

29. The computerized device of claim 28, where the means for detecting that the at least one key event is associated with a set of key events comprises means for identifying that the at least one key event is related to the set of key events.

* * * * *